United States Patent [19]

Muse

[11] 4,452,134
[45] Jun. 5, 1984

[54] COTTON HARVESTER

[76] Inventor: Jimmy L. Muse, 113 Beta, Lafayette, La. 70506

[21] Appl. No.: 399,299

[22] Filed: Jul. 19, 1982

[51] Int. Cl.³ .............................................. B30B 9/30
[52] U.S. Cl. ................... 100/90; 19/65 R; 56/30; 100/100; 100/215; 100/255
[58] Field of Search ............... 100/100, 215, 255, 102, 100/90, 91, 70 R; 19/58, 59, 65 R; 56/30, 341, 344; 198/533; 414/523

[56] References Cited

U.S. PATENT DOCUMENTS

| | | | |
|---|---|---|---|
| 1,325,589 | 12/1919 | Smith | 198/533 X |
| 2,707,364 | 5/1955 | Wagnon | 56/30 |
| 2,763,117 | 9/1956 | Wagnon | 56/30 |
| 2,869,307 | 1/1959 | Wagnon | 56/30 |
| 2,897,750 | 8/1959 | Wagnon | 100/244 |
| 3,286,858 | 11/1966 | Julien | 414/523 |
| 3,437,033 | 4/1969 | Day et al. | 100/215 |
| 3,466,857 | 9/1969 | Gaul et al. | 56/30 |
| 3,691,741 | 9/1972 | White et al. | 56/344 |
| 3,959,956 | 6/1976 | Fowler | 56/30 |
| 4,075,942 | 2/1978 | Johnson | 100/215 X |
| 4,106,267 | 8/1978 | White | 56/341 |
| 4,106,268 | 8/1978 | White et al. | 56/341 X |
| 4,193,251 | 3/1980 | Oosterling | 56/341 |
| 4,285,190 | 8/1981 | Ermachkov | 56/341 X |

Primary Examiner—Billy J. Wilhite
Attorney, Agent, or Firm—Bode & Smith

[57] ABSTRACT

An improved, hydraulically controlled, cotton harvesting apparatus comprising: cotton receiving and containing means; means for feeding cotton to a cotton boll breaking means; cotton boll breaking means comprising a roller and a brush operatively associated with said roller; cotton cleaning and ginning means comprising a plurality of cleaning saws each of said saws having a brush operatively associated therewith and on one side thereof and a rotary stripper adjacent and opposite of bottom portion of each of said saws; cotton condensing means for receiving cleaned and ginned cotton comprising a plurality of rollers and means for exhausting air therefrom; a piston horizontally mounted below the condensing means and movable between first and second positions to provide cotton to a compressing and baling means comprising an enclosure having a piston vertically mounted in the upper portion thereof and being movable from an upper to a lower position to compress and bale cotton.

6 Claims, 2 Drawing Figures

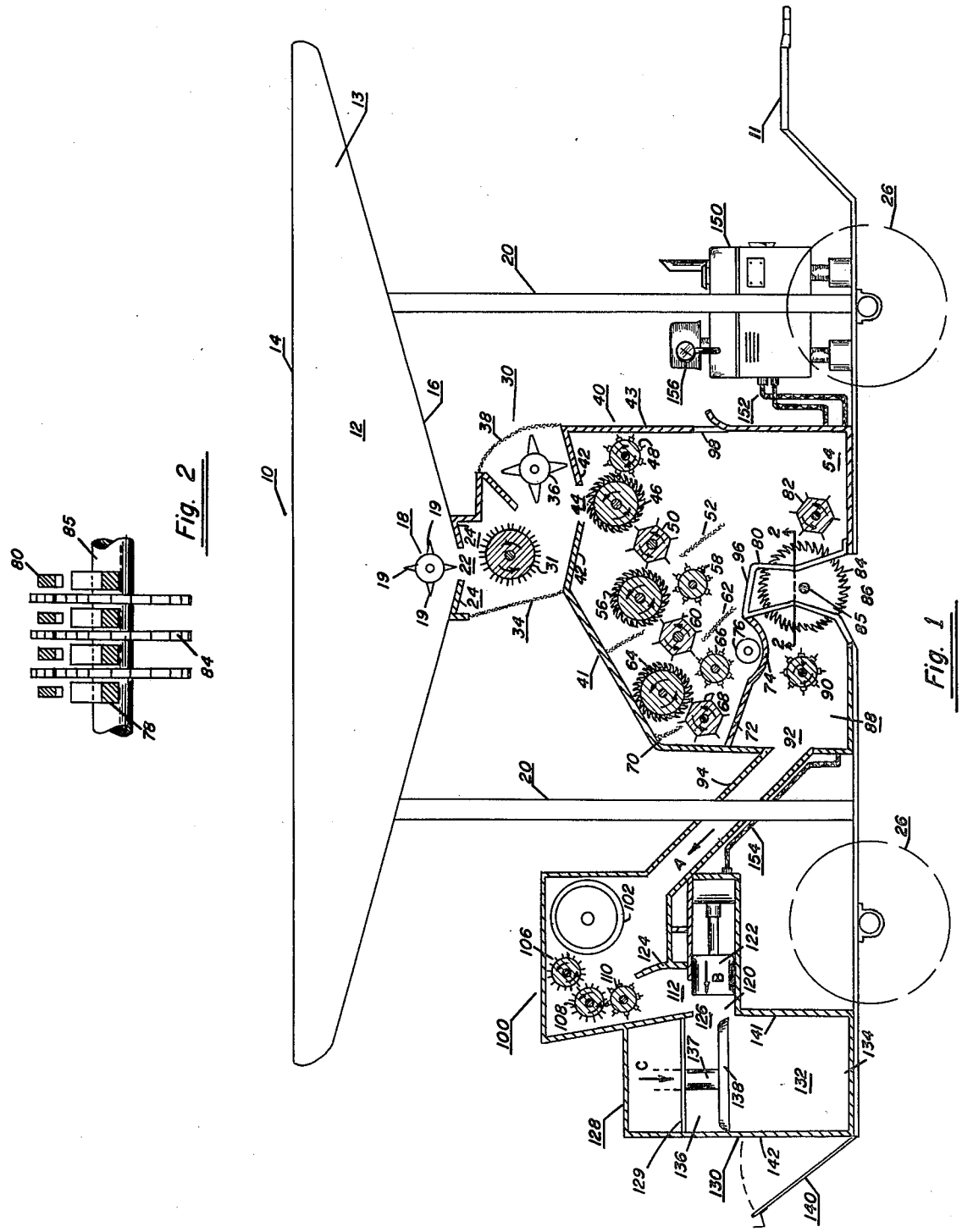

COTTON HARVESTER

BACKGROUND OF THE INVENTION

1. Field of the Invention

The present invention relates to improvements in cotton harvesters. Even more particularly, the present invention relates to a cotton combine including receiving and containing means, boll breaking means, cleaning and ginning means, condensing means and cotton collecting, compressing and baling means.

2. General Background

Various devices are known which attempt to combine cotton picking, cleaning, ginning, collecting and baling operations. Examples of such prior art devices are illustrated in the following U.S. Pat. Nos.:

2,707,364, 2,763,117, 2,869,307, 2,897,750, 3,466,857, 3,691,741, 3,959,956, 4,106,267, 4,106,268, 4,193,251, 4,285,190, 3,286,858.

Many of these devices suffer in that they fail to provide for a mobile boll breaking, cleaning, ginning, condensing, compressing and baling machine in combination to improve the farmer's efficiency.

GENERAL DISCUSSION OF THE PRESENT INVENTION

The present invention provides an apparatus to receive and store, convey, clean, gin, condense and compress and bale cotton.

The present invention provides for a trailer-mounted, hydraulically controlled cotton harvesting apparatus which comprises a cotton receiving, containing and conveying means vertically mounted over a cleaning and ginning means. The cotton receiving, containing and conveying means further comprises a compartment which has an outlet opening in the bottom portion thereof to continuously provide for the introduction of cotton into a boll breaking means and ultimately into the cleaning and ginning means.

The boll breaking means comprises an inlet in the top portion thereof for receiving the cotton from the cotton receiving, containing and conveying means, a feeder drum below the inlet opening and a brush for cotton boll breaking and separating.

The cleaning and ginning means comprises an enclosure with an inlet for receiving cotton from the boll breaking means, rotating cleaning saws and a doffing brush operatively associated with the saws and adjacent thereto, and a rotary stripper adjacent and opposite the bottom portion of the saws. At least three sets of cleaning saws are provided, with each set of saws having a doffing brush adjacent one portion of the saw periphery and a rotary stripper on the opposite side thereof. A downwardly inclined wall is located below said cleaning saws and a rotating worm is mounted above the inclined wall to convey seeds out of the enclosure.

The ginned cotton is fed from the cleaning and ginning means into a gin condenser following which the condensed cotton is forced into a cotton pressing means or baler where cotton is compressed into bales. The baler is mounted on the rear portion of the trailer so that the baled cotton may be deposited in the field, or into a trailer operating behind the harvesting apparatus.

An object of the present invention is to provide an improved cotton harvesting mechanism providing combined cleaning, ginning, condensing and baling mechanisms.

It is a further object of the present invention to provide in combination with one or more of the foregoing mechanisms a hydraulic source of power.

Yet another object is to provide a machine of the type described in which the combination includes a mobile cotton boll breaking, cleaning, ginning, condensing and baling means, particular novelty residing in the baling mechanism in combination with these units.

An additional object is to provide a machine of the type described in which the combination includes a receiving, containing and conveying means, boll breaking means, cleaning, ginning, condensing and baling means particular novelty residing in the receiving, containing and conveying mechanism in combination with these units.

BRIEF DESCRIPTION OF THE DRAWINGS

For further understanding of the nature and objects of the present invention, reference should be had to the following detailed description, taken in conjunction with the accompanying drawing, in which like parts are given like reference numerals and wherein:

FIG. 1 is a side elevational view of the apparatus of the present invention with parts broken away and shown in section.

FIG. 2 is an enlarged horizontal section of the ginning mechanism taken along line 2—2 of FIG. 1.

DETAILED DESCRIPTION OF THE PREFERRED EMBODIMENT

The cotton harvester of the present invention is constructed of a plurality of units which are operatively connected to each other in which cotton, which has been picked or stripped from the stalks, is first partially cleaned ridding the cotton of debris and separating and breaking the cotton bolls from the cotton in transit. Next units clean the cotton, gin the cotton, discard any remaining cotton debris, condense the cotton and finally compress the cleaned cotton to form a bale.

Referring to FIG. 1, the trailer-mounted cotton harvester of the present invention is designated generally by the numeral 10. The several units mounted on trailer 11 are indicated as follows: the cotton receiving, containing and conveying means 12, cotton boll breaking and separating means 30, cotton cleaning and ginning mechanism 40, cotton gin condensing mechanism 100 and cotton compressing and baling mechanism 130. Power is supplied by a conventional hydraulic power source 150.

After cotton is stripped from stalks by a picking or stripping unit, the cotton is loaded into cotton receiving, containing and conveying means 12 which is further comprised of a hollow compartment or hopper 13 vertically mounted over trailer or wheeled-base 11, which is connected to conventional towing vehicle such as a tractor. Hopper 13 is supported by four vertical columns 20 (two of the columns being hidden behind the columns shown in FIG. 1) to form the superstructure of the apparatus. Compartment or hopper 13 has an upper opening 14 for receiving the stripped cotton which is fed by gravity to the bottom portion of hopper 13 assisted by inclined walls 16. The lower portions 24 of inclined walls 16 create at their terminus outlet 22 which also serves as a cotton inlet for boll breaking mechanism 30. Hydraulically powered cotton feeding means 18 is further comprised of a plurality of brushes 19 mounted on an elongated cylindrical shaft that is horizontally mounted across the width of hopper 13 and caused to rotate and thereby assist the stripped cotton to feed from hopper 13 into boll breaking mechanism 30 at outlet/inlet 22.

As cotton enters boll breaking mechanism 30 at inlet 22, the cotton is dumped onto feeder drum 31 having a plurality of radially extending teeth 32. Located on one side of feeder drum 31 is a screen 34. Drum 31 feeds the cotton, by its counter-clockwise movement onto the rotating fan beater or fluffer 36 which by its clockwise movement beats the cotton knocking out dust and breaking it and throws the cotton against curved screen 38. While the feeder drum 31 rotates in a counterclockwise direction so as to force air into boll breaking mechanism 30 through screen 34, fluffer 36 rotates in a clockwise direction which causes movement of the air towards curved screen 38, thus blowing out additional trash through the screen. The cleaned cotton is then dropped onto the inclined sides 42 which form part of the top of cotton boll ginning (separating) and cleaning mechanism or extractor 40.

Located in housing or enclosure 41 of cotton extractor 40, immediately below inlet opening 44 to extractor 40 are rotating cleaning saws 46 which rotate in a counter-clockwise direction as viewed in the FIG. 1. Rotating in a clockwise direction, to the right of and slightly above the saws, is rotating doffing brush 48, and located to the left of said saws is rotating stripper 50. The axis of stripper 50 is at a 45° angle from the horizontal line extending to the axis of the saws and is below and to the left of said axis. Stripper 50 rotates in a counter-clockwise direction. Located immediately below stripper 50 is stationary inclined screen 52 which deflects the stripped cotton to space 54 formed at the right lower end of separator or extractor 40, which forms part of the gin stand.

A second set of rotating cleaning saws 56 are located slightly above and to the left of the stripper 50 and located below these saws is a second doffing brush 58. Second stripper 60 is mounted in housing 41 to the left of the second set of saws 56 and second brush 58. Second stripper 60 rotates in a counter-clockwise direction and has provided immediately below the rotating blades thereof a second inclined screen 62. Located to the left of the stripper 60 and slightly below the axis of the second saws 56 is a third set of rotating cleaning saws 64. Beneath and slightly to the right of saws 64 is a third doffing brush 66 and to the left of both elements 64 and 66 is a third stripper 68.

It will be noted that each of the strippers 50, 60 and 68 are located to the left of and below the saws 46, 56 and 64 respectively and that the periphery of each saw is substantially tangent to the path of the teeth of the stripper which lies below its adjacent saw.

Located to the left of third set of saws 64 and slightly above its stripper 68 is a stationary curved screen 70. The purpose of screen 70 is to direct any cotton which is moved to the left of the saws 64 downwardly onto stripper 68. Located below saws 64, brush 66 and stripper 68 is an inclined wall 72 which extends horizontally across the entire housing 41 and which is provided with trough 74 for reception of rotating worm 76 which worm acts to carry seeds which fall through trough 74 out of housing 41.

Cotton from each set of saws, brushes and strippers falls into space 54. The cotton locks which are freed from some of the seeds and which are in space 54 are engaged by brush 82 which is rotating in a counter-clockwise direction and are forced into saws 84 which comprise a plurality of individual saws spaced horizontally from each other along shaft 85 upon which they are mounted. Saws 84 rotate between the bars or ribs 78 and 80 as shown in FIG. 2.

The cotton locks roll along between the two rows of bars 78, 80 with the saws 84 taking the lint off the seed. The left row of bars 78 are preferably more closely spaced from each other than the right row 80, and the left row prevents further movement to the left of the seeds because of this closer spacing of the bars. The seeds fall into the seed outlet 86 and onto the ground. The rotating saws 84 continue to engage the cotton and move the cotton to the left and into the space 88 where it is engaged by rotating brush 90 and moved toward outlet opening 92 which forms the inlet to conduit 94 leading to cotton condensing mechanism or condenser 100.

It will noted that the entire lower portion of the cleaning and ginning mechanism 40 forms the gin stand. In other words, the inclined wall 72 and the upper inclined portion 96 of bars 80 form the top of the gin stand, the operating parts of which include the brush 82, saws 84, brush 90 and bars 78 and 80. As seen in FIG. 1, vertical wall 43 is provided with an opening 98 forming an outlet for surplus air within the gin stand.

As noted above, the ginned cotton is conveyed up conduit or pipe 94 in the direction of Arrow A to condenser 100 as shown in FIG. 1 Condenser 100 is a housing having a horizontal outlet opening (not shown) and hydraulically driven rotating drum 102 whose periphery is covered with a screen mounted therein. Located in the drum is a fan (not shown). Surplus air in condenser 100 is separated from the cotton by passing through perforations of drum 102 and out of the horizontal outlet opening assisted by the fan. The cotton is then engaged by a pair of carding rollers 106, 108, which both rotate in the same direction as shown in FIG. 1. After cotton has been carded by these rollers, the lower most roller 108 of the pair deposits the cotton onto feed roller 110 which rotates clockwise and causes the cotton to fall downward, guided by curved wall 124, to opening or condenser outlet 112 where it is deposited in cotton compressor feed area 120. Here, hydraulically imparted longitudinal movement of compressor feed piston 122 in the direction of Arrow B feeds the condensed cotton from feed area 120 through inlet opening 126 into the upper portion of baling bin 132 of cotton compressor and baling mechanism 130.

Cotton compressor and baling mechanism 130 is comprised of enclosure 128 having support plate 129 laterally mounted in its upper portion. Located in wall 141 of enclosure 128 is inlet opening 126 through which condensed cotton is provided by the above-referenced longitudinal movement of feed piston 122. As seen in FIG. 1, plate 129 is mounted above inlet opening 126 through which the condensed cotton is provided by the longitudinal movement of feed piston 122. As also seen in FIG. 1, plate 129 is mounted above inlet opening 126 so as to provide for baling bin 132 which comprises the portion of enclosure 128 below plate 129. Plate 129 supports cylinder 137 vertically above baling bin 132. Cylinder 137 has attached to its lower end portion compaction disk or piston press 138 which is of dimensions slightly smaller than baling bin 132. Cylinder 137 is hydraulically operated by hydraulic power source 150 through hydraulic lines (not shown) and reciprocates from a first upper position abutting plate 129 to a second lower position dependent on the mass of cotton in bin 132. In this way piston press 138, powered by hydraulic power source 150, compacts cotton fed into bin 132 into bales on its downward stroke in the direction of Arrow C. These bales may be periodically deposited on the ground or in a suitable receptacle (not shown) through door 140 provided in side wall 142 of compressor and baling mechanism 130.

During operation, compressor feed piston 122 and piston press 138 reciprocate in synchronization in a manner such that piston press 138 is at its fully raised or upper position abutting plate 129 during the forward movement (in the direction of Arrow B in FIG. 1) of feed piston 122 so that compressor inlet 126 is fully opened and in communication with bin 132. The downward motion of piston press 138 will not begin until piston 122 has moved through a complete cycle and has reached the full terminus of its forward motion, (that is to inlet 126 in FIG. 1). In this way, in sequence, cotton is fed by feed piston 122 from cotton compressor feed area 120 through inlet 126 into bin 132 and then compressed by piston press 138.

The power source for driving these several units is provided by hydraulic power source 150 which provides hydraulic power through hydraulic lines 152 and 154, and other hydraulic lines, (not shown for convenience in the Figures). The power source is controlled by conventional regulator 156.

The above-description and drawings disclose a single embodiment of the invention and specific language has been employed in describing the several Figures. It will, nevertheless, be understood that no limitations as to the scope of the invention are thereby contemplated and that various alterations and modifications may be made such as would occur to one skilled in the art to which the invention relates.

I claim:

1. A cotton combine comprising:
   a. a frame, said frame providing a base and a super-structure;
   b. means for containing cotton mounted on said super-structure comprising a first enclosure having an inlet opening in the top portion thereof, inclined walls terminating in an outlet opening in the lower portion thereof and means for feeding cotton through said outlet opening;
   c. cotton boll breaking means below said outlet opening comprising a second enclosure having an inlet opening in communication with said outlet opening, a roller with a plurality of radially extending teeth, a rotating fan beater operatively associated with said roller, a plurality of screens for providing for movement of air through said boll breaking means and outlet means in the lower portion thereof;
   d. cotton cleaning and ginning means comprising a third enclosure having an inlet opening in the top portion thereof in communication with said cotton boll breaking outlet means, a cleaning saw below said inlet opening, a brush operatively associated with said saw adjacent one-side thereof, a rotary stripper adjacent an opposite and bottom portion of said saw, at least one additional cleaning saw, rotary stripper and brush spaced downwardly and laterally of said first mentioned saw and adjacent said rotary stripper, a ginning means in said third enclosure below said cleaning saws and an outlet opening;
   e. an outlet for surplus air in said third enclosure of said cotton cleaning and ginning means;
   f. cotton condensing means comprising an inlet opening in communication with said cleaning and ginning means outlet opening for receiving cleaned and ginned cotton, a plurality of rollers, a means for exhausting air and an outlet opening;
   g. a piston horizontally mounted below said condensing means and movable between first and second positions thereby permitting cotton to be provided to a cotton compressing and baling means; and;
   h. a rotating brush in said third enclosure for directing cleaned and ginned cotton from said cleaning and ginning means to said condensing means.

2. The apparatus of claim 1 further comprising: cotton compressing and baling means comprising a fourth enclosure, an inlet opening for receiving cotton from said cotton condensing means outlet opening, a piston vertically mounted in the upper portion of said fourth enclosure and being movable from an upper to a lower position whereby cotton is compressed and formed into bales.

3. The apparatus of claim 1 wherein said cleaning and ginning means includes at least three saw means each saw means having a brush and a stripper adjacent thereof.

4. The apparatus of claim 1 wherein said means for feeding cotton comprises a plurality of brushes rotatably mounted on an elongated cylindrical shaft horizontally mounted in said first enclosure.

5. The apparatus of claim 2 wherein said apparatus is hydraulically controlled.

6. The apparatus of claim 2 wherein said vertically mounted piston and horizontally mounted piston are operatively associated whereby said horizontally mounted piston is movable between a first and second position when said vertically mounted piston is in an upper position.

* * * * *